United States Patent [19]

Jones

[11] Patent Number: 4,814,601

[45] Date of Patent: Mar. 21, 1989

[54] OPTICAL DISPLACEMENT SENSOR USING COLOR VARIATIONS TO MONITOR DISPLACEMENT OF TWO GRATINGS.

[75] Inventor: Gordon R. Jones, Heswall, England

[73] Assignee: The University of Liverpool, Liverpool, United Kingdom

[21] Appl. No.: 168,450

[22] Filed: Mar. 15, 1988

[30] Foreign Application Priority Data

Mar. 17, 1987 [GB] United Kingdom ............... 8706317

[51] Int. Cl.$^4$ .............................................. G01J 3/50
[52] U.S. Cl. .................................. 250/226; 250/227; 250/237 R
[58] Field of Search ................ 250/226, 227, 231 SE, 250/237 G, 237 R; 356/373, 374, 405

[56] References Cited

U.S. PATENT DOCUMENTS

| | | | |
|---|---|---|---|
| 3,553,469 | 1/1971 | Stutz et al. ............... | 250/231 SE |
| 4,334,152 | 6/1982 | Dakin et al. .............. | 250/231 SE |
| 4,689,485 | 8/1987 | McMurtry ................. | 250/231 SE |
| 4,694,690 | 9/1987 | Jones et al. .............. | 250/226 |
| 4,740,688 | 4/1988 | Edwards .................. | 250/226 |

Primary Examiner—David C. Nelms
Assistant Examiner—Stephone B. Allen
Attorney, Agent, or Firm—John S. Hale

[57] ABSTRACT

A moire fringe displacement sensor includes first and second gratings (3) (4), a polychromatic light source (1) illuminating the gratings, and a detector (8). The gratings are disposed such that a relative displacement of the first and second gratings causes a variation in the color of the light reaching the detector. The detector (8) comprises first and second photo-responsive elements (11) (12), the responsivity with respect to wavelength of the first element (11) being different from that of the second (12). Signals from the photo-responsive elements are fed to a micro-processor (15) which calculates the color of the light incident on the detector as represented by two or more parameters on the Chromaticity (CIE) Diagram, and interprets the color in terms of the displacement of the first and second gratings.

10 Claims, 2 Drawing Sheets

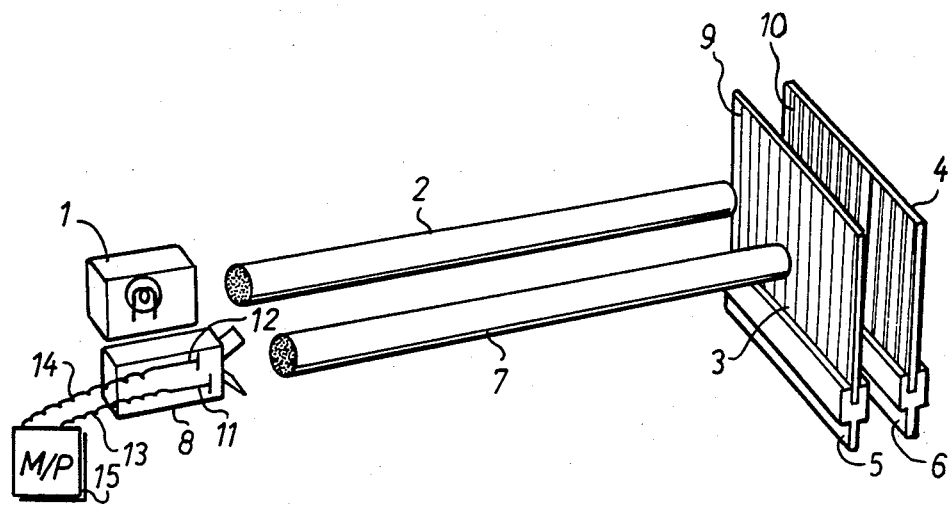
Fig_1
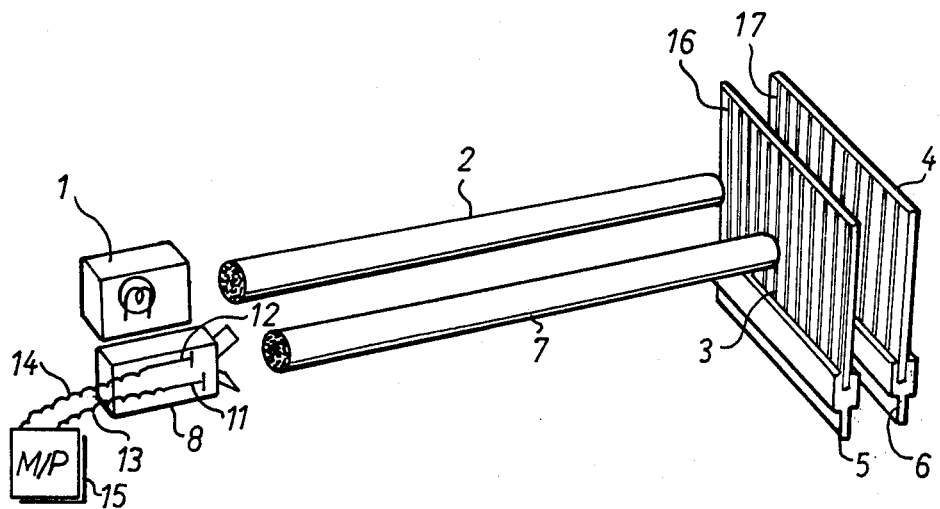
Fig_2

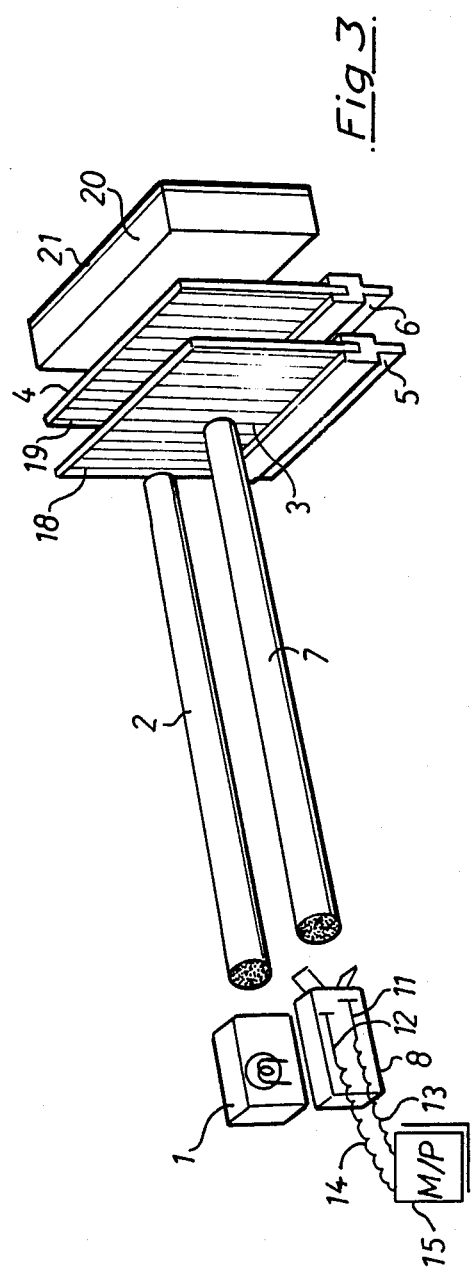
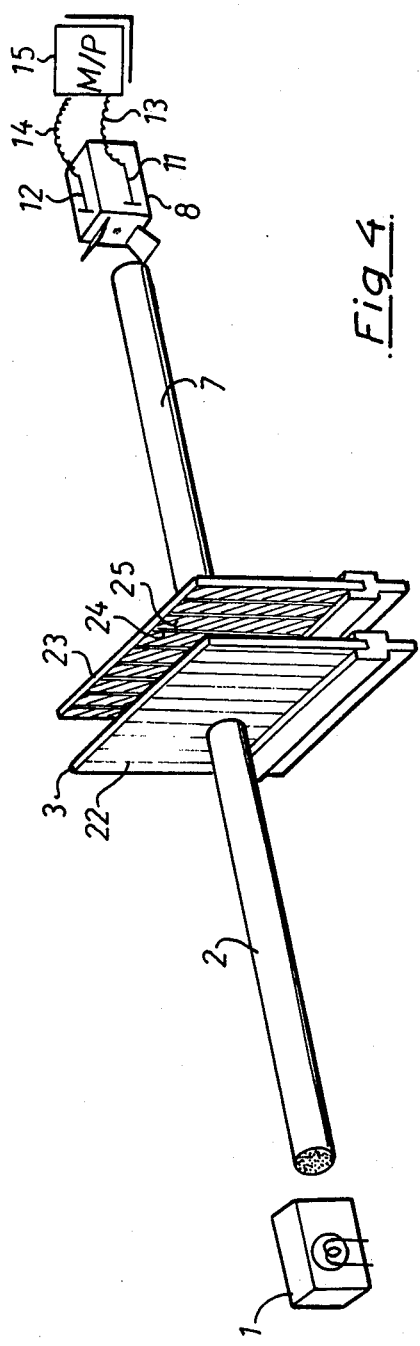

OPTICAL DISPLACEMENT SENSOR USING COLOR VARIATIONS TO MONITOR DISPLACEMENT OF TWO GRATINGS.

BACKGROUND OF THE INVENTION

This invention relates to optical sensors, and in particular to moire fringe displacement sensors.

In moire fringe displacement sensors, first and second gratings are disposed adjacent one to another, such that moire fringes are produced. Relative movement of the gratings causes a corresponding movement of the moire fringes, which movement is detected by monitoring the amplitude of light reaching a detector. One problem encountered with such sensors is that a constant source is required as any modulation in the strength of the source is indistinguishable by the detector from modulation caused by the movement of the moire fringes.

SUMMARY OF THE INVENTION

It is an object of the present invention to provide a moire fringe sensor which overcomes this problem.

Accordingly there is provided apparatus for measuring displacement between first and second members comprising a polychromatic light source; a detector; first and second gratings; means for supporting the first grating for movement with the first member; means for supporting the second grating for movement with the second member, the arrangement being such that the source is adapted to illuminate the first and second gratings with polychromatic light and the first and second gratings are disposed relative one to the other such that a relative displacement between the first and second members causes a corresponding variation in the color of the light reaching the detector, the detector being adapted to detect the intensity of polychromatic light incident thereon at a plurality of different wavelengths; and analysis means adapted to receive signals from the detector and to calculate therefrom the relative displacement between the first and second members.

Conveniently the detector is adapted to monitor the ratio of incident light intensities at two or more separate predetermined wavelengths. In a preferred alternative, the detector comprises at least first and second photo-responsive elements, the responsivity with respect to wavelength of the first element being different from that of the second, signals from the photo-responsive elements being fed to the analysis means which calculates, from the signals from the photo-responsive elements, the color of the polychromatic light incident on the detector as represented by two or more parameters on the Chromaticity (CIE) Diagram.

In one convenient arrangement two different photo-responsive elements are employed, each with its own wavelength responsivity characteristic. Alternatively, one or both of the photo-responsive elements includes a colored filter to impart a color response characteristic, thereby allowing two identical photo-responsive elements to be employed, if desired. Preferably, the responsivity with respect to wavelength of the at least first and second photo-responsive elements is such that their respective wavelength/intensity curves overlap for at least a part of the wavelength spectrum.

By employing at least first and second photo-responsive elements, a change of color is determined by assessing the change in the whole of a selected part of the spectrum (color modulation) as opposed to merely detecting the change at two or more selected wavelengths (wavelength modulation). Thus a change from color A (represented by wavelength/intensity curve A) to color B (represented by wavelength/intensity curve B) will be calculated from the area between the two curves, thereby giving a more complete analysis of 'true' color. Wavelength modulation is less sophisticated in that it is a calculation based on the distance between the curves at two or more selected wavelengths.

By the term 'polychromatic light' there is herein meant any multi-wavelength radiation, and is specifically meant to include both visible light and infra red radiation. The term 'color', whilst used herein for ease of understanding, should in no way imply that only visible light may be emmployed. Where the apparatus employs a source emitting radiation outside of the visible spectrum, the term 'color' will refer to the spectral distribution of the radiation.

Conveniently at least one of the first and second gratings is provided with colored markings. The at least one grating conveniently comprises markings which absorb one or more wavelengths and reflect others, interspersed with non-reflective regions. This arrangement is employed in a reflective mode moire fringe sensor in which the source and detector are positioned on the same side of the first and second gratings. The non-reflective regions may be either absorbing regions or transmitting regions, both providing areas from which no light signal is returned to the detector. In an alternative transmissive mode moire sensor, the at least one grating comprises markings which absorb one or more wavelengths and transmit others, interspersed with non-transmissive regions. In this arrangement the source and detector are positioned on opposite sides of the first and second gratings, and the non-transmissive regions may be either absorbing regions or reflective regions. Conveniently both of the first and second gratings are provided with colored markings.

Alternatively, in addition to the first and second gratings, there is also provided a colored filter between the source and the detector. Preferably the polychromatic light passes through the colored filter after it has passed through the first and second gratings. As before, either transmissive mode or reflective mode sensors may be employed.

The invention further resides in a method of measuring displacement employing apparatus as herein described. In particular there is provided a method of measuring displacement between first and second members including the steps of providing first and second gratings; supporting the first grating for movement with the first member; supporting the second grating for movement with the second member; illuminating the first and second gratings with polychromatic light, the arrangement being such that the first and second gratings are disposed relative one to the other such that a relative displacement between the first and second members causes a corresponding variation in the color of the light passing through or reflected from the first and second gratings; detecting the intensity of the polychromatic light passing through or reflected from the first and second gratings at a plurality of different wavelengths; and calculating, from the detected intensity of the polychromatic light, the relative displacement of the first and second members.

Conceivably the method includes the step of monitoring the ratio of detected light intensities at two or more selected wavelengths. In a preferable alternative the method includes the steps of detecting the polychromatic light with a detector comprising first and second photo-responsive elements, the responsivity with respect to wavelength of the first element being different from that of the second; calculating, from the output of the first and second photo-responsive elements, the color of the polychromatic light incident on the detector as represented by two or more parameters on the Chromaticity (CIE) Diagram; and interpreting the color of the polychromatic light incident on the detector in terms of the relative displacement of the first and second members.

BRIEF DESCRIPTION OF THE DRAWING

FIGS. 1, 2, 3 and 4 are schematic diagrams of alternative embodiments of displacement measuring apparatus according to the invention.

DESCRIPTION OF THE PREFERRED EMBODIMENTS

Refering to FIG. 1 there is shown a polychromatic light source 1, such as an LED, light from which is transmitted by an optical fibre 2 to first and second gratings 3 and 4. The gratings 3 and 4 are each supported by a respective holder 5, 6 which is attachable to members (not shown) the relative displacement of which is to be measured. For example this displacement may be the movement between the piston of a hydraulic cylinder and its casing. Light reflected from the first and second gratings 3 and 4 is transmitted by means of a second optical fibre 7 to a detector 8.

The grating 3 is ruled with a pattern of reflective markings 9, whilst the grating 4 is ruled with a similar patern of color markings 10. The color markings 10 serve to absorb certain wavelengths of light and reflect others, whilst the areas between the markings allow the light to pass therethrough. The gratings 3 and 4 are such that they generate a pattern of moire fringes, which fringes move when one grating is displaced relative to the other. Due to the colored markings 10, a different color signature is imposed on the light reaching the detector 8 depending on the displacement of one grating relative to the other.

The detector 8 comprises two photo-responsive elements 11 and 12, signals from which are passed via lines 13 and 14 to a micro-processor 15 for analysis. The micro-processor 15 calculates the color of the detected light in terms of two parameters on the Chromaticity (CIE) Diagram from the signals from the photo-responsive elements 11 and 12. The micro-processor, on detecting a change in color, may give an indication of the displacement of one grating relative to the other, for example on a display unit (not shown).

FIG. 2 shows a similar arrangement to FIG. 1 in which like features are designated with like reference numerals. In this arrangement both gratings 3 and 4 are provided with colored markings 16 and 17, the color of the markings 16 being different from the markings 17. As before a displacement of one grating relative to the other changes the color signature of the light reaching the detector 8, which color is calculated to determine the extent of the displacement.

FIG. 3 shows an alternative arrangement in which both gratings 3 and 4 are provided with markings 18, 19, which reflect all wavelengths of light generated by the source 1. Behind the gratings 3 and 4 there is provided a colored filter 2 which absorbs some wavelengths, thereby imparting a color signature to the light. The light passing through the filter 20 is reflected by a silvered layer 21 so that it passes back through the gratings and reaches the detector 8. The result of this arrangement is again a color encoded signal which is analyzed by the micro-processor 15 to establish any displacement of the gratings 3 and 4.

FIG. 4 shows a transmission version of the displacement measuring apparatus. Grating 3 is provided with markings 22 which either reflect or absorb light incident thereon. The spaces between the markings allow the light to be transmitted unaltered to grating 23 which is formed of a colored glass having reflective or absorbing markings 24 thereon. Light falling on regions 25 between the markings 24 passes through the grating but is altered by the color glass to impart a color signature to the signal reaching the detector 8. As before the microprocessor 15 calculates the color of the light reaching the detector to give an indication of the displacement between the gratings 3 and 23.

I claim:

1. Apparatus for measuring displacement between first and second members comprising first and second gratings; a polychromatic light source for illuminating the first and second gratings with polychromatic light; a detector for detecting the intensity of polychromatic light incident thereon at a plurality of different wavelengths; means for supporting the first grating for movement with the first member; means for supporting the second grating for movement with the second member; analysis means; and means for supplying signals from the detector to the analysis means; the arrangement being such that the first and second gratings are disposed relative one to the other such that a relative displacement between the first and second members causes a corresponding variation in the color of the light reaching the detector, the analysis means calculating the relative displacement between the first and second members from the signals from the detector.

2. Apparatus according to claim 1 wherein the detector comprises means for monitoring the ratio of incident light intensities at two or more separate predetermined wavelengths.

3. Apparatus according to claim 1 wherein the detector comprises at least first and second photo-responsive elements, the responsivity with respect to wavelength of the first element being different from that of the second, the analysis means including means for calculating, from the signals from the photo-responsive elements, the color of the polychromatic light incident on the detector as represented by two or more parameters on the Chromaticity (CIE) Diagram.

4. Apparatus according to claim 1 wherein at least one of the first and second grotings is provided with coloured markings.

5. Apparatus according to claim 4 wherein the at least one grating comprises markings which absorb one or more wavelengths and reflect others, interspersed with non-reflective regions.

6. Apparatus according to claim 4 wherein the at least one grating comprises markings which absorb one or more wavelengths and transmit others, interspersed with non-transmissive regions.

7. Apparatus according to claim 1 wherein in addition to the first and second gratings, there is also provided a colored filter between the source and the detector.

8. A method of measuring displacement between first and second members including the steps of providing first and second gratings; supporting the first grating for movement with the first member; supporting the second grating for movement with the second member; illuminating the first and second gratings with polychromatic light, the arrangement being such that the first and second gratings are disposed relative one to the other such that a relative displacement between the first and second members causes a corresponding variation in the color of the light passing through or reflected from the first and second gratings; detecting the intensity of the polychromatic light passing through or reflected from the first and second gratings at a plurality of different wavelengths; and calculating, from the detected intensity of the polychromatic light, the relative displacement of the first and second members.

9. A method according to claim 8 including the step of monitoring the ratio of detected light intensities at two or more selected wavelengths.

10. A method according to claim 8 including the steps of detecting the polychromatic light with a detector comprising first and second photo-responsive elements, the responsivity with respect to wavelength of the first element being different from that of the second; calculating, from the output of the first and second photo-responsive elements, the color of the polychromatic light incident on the detector as represented by two or more parameters on the Chromaticity (CIE) Diagram; and interpreting the color of the polychromatic light incident on the detector in terms of the relative displacement of the first and second members.

* * * * *